(No Model.) 11 Sheets—Sheet 1.

M. E. KNIGHT & H. B. STEELE.
SOLE CUTTING MACHINE.

No. 444,982. Patented Jan. 20, 1891.

WITNESSES.
J. L. Belfler
F. D. Lawrence

INVENTORS.
Margaret E. Knight
Herbert B. Steele (No Model.) 11 Sheets—Sheet 3.
M. E. KNIGHT & H. B. STEELE.
SOLE CUTTING MACHINE.

No. 444,982. Patented Jan. 20, 1891.

WITNESSES. INVENTORS.

(No Model.) 11 Sheets—Sheet 4.

M. E. KNIGHT & H. B. STEELE.
SOLE CUTTING MACHINE.

No. 444,982. Patented Jan. 20, 1891.

Fig. 4.

WITNESSES.
INVENTORS.

(No Model.) 11 Sheets—Sheet 5.

M. E. KNIGHT & H. B. STEELE.
SOLE CUTTING MACHINE.

No. 444,982. Patented Jan. 20, 1891.

Fig. 5.

WITNESSES.

INVENTORS.
Margaret E. Knight
Herbert B. Steele (No Model.) 11 Sheets—Sheet 7.

M. E. KNIGHT & H. B. STEELE.
SOLE CUTTING MACHINE.

No. 444,982. Patented Jan. 20, 1891.

Fig. 4.

WITNESSES.
J. L. Beffler
F. D. Latimer

INVENTORS.
Margaret E. Knight
Herbert B. Steele (No Model.) 11 Sheets—Sheet 8.

M. E. KNIGHT & H. B. STEELE.
SOLE CUTTING MACHINE.

No. 444,982. Patented Jan. 20, 1891.

Fig-9-

WITNESSES.
J. L. Belcher
F. B. Lawrence

INVENTORS.
Margaret E. Knight
Herbert B. Steele (No Model.) 11 Sheets—Sheet 9.
M. E. KNIGHT & H. B. STEELE.
SOLE CUTTING MACHINE.

No. 444,982. Patented Jan. 20, 1891.

WITNESSES.
J. L. Belfler.
J. P. Lawrence.

INVENTORS.
Margaret E. Knight
Herbert B. Steele.

(No Model.) 11 Sheets—Sheet 11.

M. E. KNIGHT & H. B. STEELE.
SOLE CUTTING MACHINE.

No. 444,982. Patented Jan. 20, 1891.

Fig. 12.

WITNESSES.

INVENTORS.
Margaret E. Knight
Herbert B. Steele

UNITED STATES PATENT OFFICE.

MARGARET E. KNIGHT, OF SOUTH FRAMINGHAM, AND HERBERT B. STEELE, OF MEDFORD, MASSACHUSETTS.

SOLE-CUTTING MACHINE.

SPECIFICATION forming part of Letters Patent No. 444,982, dated January 20, 1891.

Application filed August 1, 1890. Serial No. 360,693. (No model.)

*To all whom it may concern:*

Be it known that we, MARGARET E. KNIGHT, of South Framingham, and HERBERT B. STEELE, of Medford, both in the county of Middlesex and State of Massachusetts, have invented certain new and useful Improvements in Machines for Cutting Shoe-Soles and other Articles of Curvilinear Outline, of which the following is a specification.

Our invention relates to the class of machines such as is described in the application of Margaret E. Knight, Serial No. 333,394, filed December 12, 1889, in which the strip of material is automatically fed to the machine, a blank of the requisite size cut therefrom and placed upon a pattern of the shape desired for the article, there held and cut to the outlines of the pattern, and, if desired, stamped or embossed with suitable marks and then removed from the machine; and it consists of the improvements in the construction and novel combination of parts hereinafter more particularly described and shown.

In the drawings which form a part of this specification, Fig. 3, a plan view of the machine; Fig. 8, an enlarged view of the cutters or trimming devices and the mechanism which supports and carries them.

Similar letters and figures in the several views of the drawings indicate the same part of the machine, in which the frame consists of a horizontal shallow box-like bed A, from which four branches $A'$ $A^2$ $A^3$ $A^4$ project outwardly and upwardly, the whole being supported upon legs $a$ $a'$ $a^2$ $a^3$. The projecting parts $A'$ $A^2$ support duplicate sets of cutters, their frames, and operating mechanism; $A^3$, the embossing devices; $A^4$, standards for the blank-cutting and pattern-loading mechanism.

B is a central turret, which supports and carries the patterns E $E'$ $E^2$ $E^3$ and their hollow spindles $E^4$, and has an upper bearing upon a conical shell or sleeve C, which rests upon the bed A. The hollow spindle $B'$ of the turret extends downward through the hollow end of the sleeve C, in which it has a bearing also, and has a disk $c$ secured upon its lower end. (Best seen in Fig. 4.) The turret B is caused to rotate intermittently by means of the disk $c$, which at regular intervals is locked to and released from another disk $b$, which is free to turn upon the lower end of the spindle $B'$ and has gear-teeth upon a quarter of its periphery. This quadrant-gear $b$ is given a reciprocating rotary motion upon the spindle $B'$ by engaging with a rack $c^2$ upon a reciprocating rack-bar $c^3$, Fig. 5.

Figure 12:
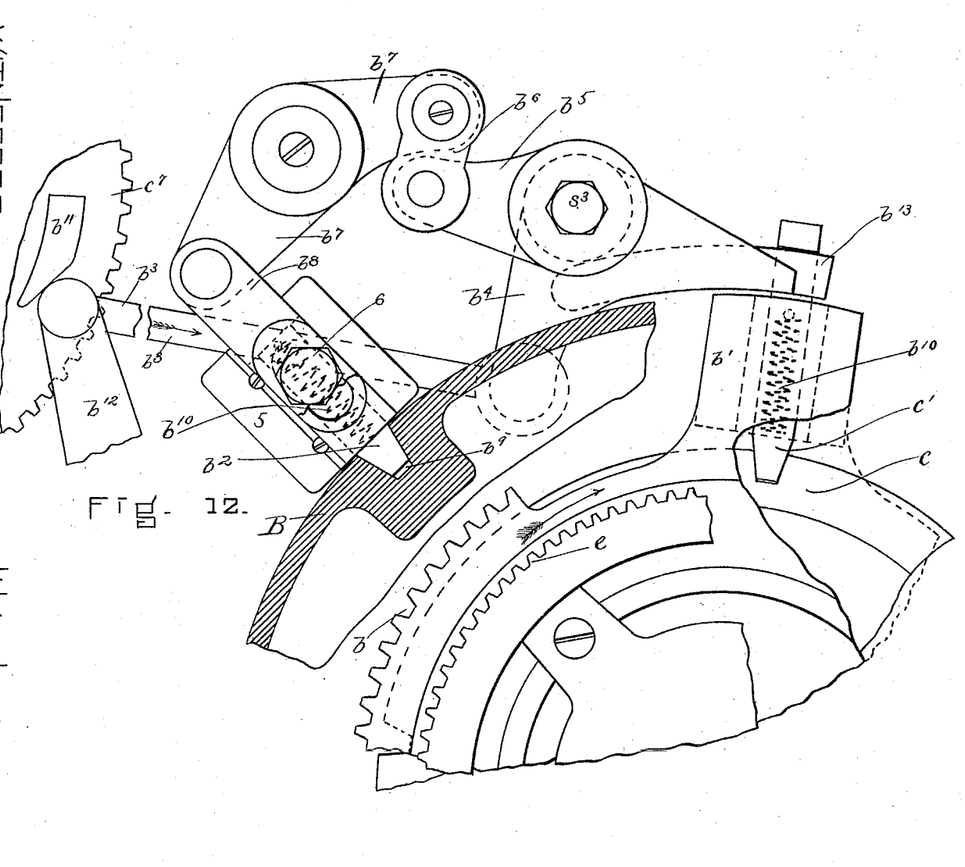
Fig. 12, an enlarged plan view of the locking devices of the pattern-carrier or turret and their operating-levers, and of portions of the turret-turning gears and of the turret B in section.

As seen in Fig. 12, the locking and releasing of the disk $c$ and the quadrant-gear $b$ is effected by means of a bolt or latch $c'$, which slides in a groove upon the under side of a lug $b'$, projecting from the disk $b$, and which by the action of a spring $b^{10}$ is caused to enter one of the depressions of the same shape as the end of the latch formed in the periphery of the disk $c$, and the latch is withdrawn from such depressions by a curved projecting rib $b^{13}$ upon the under side of the bell-crank $b^4$, which is secured upon a shaft $s^3$. The lever $b^4$ is turned to and fro with its shaft $s^3$ by a cam projection $b^{11}$ on the upper side of the gear $c^7$ through the rod $b^3$, and a cam-roll on the end of a crank-lever $b^{12}$, with which it is connected. As soon as the latch $c'$ is withdrawn from its socket in the periphery of the disk $c$ the quadrant-gear $b$ is turned back in a direction opposite to that indicated by the arrow through an arc of ninety degrees by the movement of the rack $c^2$ on the rack-bar $c^3$ in the direction indicated by the arrow thereon, Fig. 5, when the latch $c'$ is pushed into another socket in the disk $c$ by the spring $b^{10}$. The turret B is at rest while the blank is being trimmed to the shape of the pattern on which it is held, and during that time the turret is firmly held in place by another latch $b^2$, the end of which is forced into a similarly-shaped depression $b^9$ in the periphery of the turret by another spring $b^{10}$. The latch $b^2$ is supported by a bracket 5 and slides in a slot therein. The latch $b^2$ is withdrawn from its socket in the turret by a continuation of the movement of the rod $b^3$ in the direction of the arrow thereon, Fig. 12, through its connection therewith by the crank-lever $b^4$, shaft $s^3$, lever $b^5$, link $b^6$, lever $b^7$, and link $b^8$; but in order that the latch $b^2$ may not be withdrawn from the socket in the turret before the latch $c'$ has engaged with another socket in the disk $c$ after being withdrawn from one in the position in which it is shown in Fig. 12, we form a slot in the link $b^8$ a little longer than the depth of the sockets for the latch $c'$ in the disk $c$, so that while the latch $c'$ is being withdrawn from one socket and is moving back to the next the link $b^8$ can move outward a distance equal to the length of the slot therein before it begins to act upon the bolt 6, which projects through the said slot and is made fast to the latch $b^2$. As soon as the latch $b^2$ is withdrawn from the socket in the turret by the continued outward movement of the link $b^8$, the rack-bar $c^3$ starts back in a direction opposite to that indicated by the arrow, Fig. 5, thereby turning the quadrant-gear $b$ to the position shown in Fig. 12, and with it the disk $c$, to which it is locked by the latch $c'$, and also the turret B, which is secured to the same spindle B'. The rack-bar $c^3$ is of a flat T shape, and is sustained in ways $c^4$, Fig. 4, upon the under side of the bed of the machine, wherein it can slide. This rack-bar is caused to reciprocate by its connection with a gear $c^7$ through the connecting-rod $c^5$, crank $c^6$, and drag-link $c^8$, which is pivoted to the under side of the gear $c^7$ on the shaft $c^{10}$, and by the operation of which the rack-bar $c^3$ is given a slow advance while turning the patterns and a quick return while rotating the turret B. The gear $c^7$ is rotated by its connection with the main shaft D through the gears and shafts 7 8 9 10 11 12 13 14 15 16 17.

D is the main shaft of the machine, supported in bearings D' D² D³, and from which motion is communicated to all the other operating parts, and power is communicated to it through the gear $d^4$ from the pulley $d'$, clutch $d^2$, with the attached gear $d^3$, all loose upon the shaft $d$. The said clutch is operated by either of two double treadles $d^6$ upon the shaft $d^5$ through a crank $d^7$, rod $d^8$, and shipping-lever $d^9$, having its fulcrum at $d^{11}$, Figs. 2 and 3. In the position shown in Fig. 2 the clutch $d^2$ is in contact with the driving-pulley $d'$, and by reversing the position of the treadles illustrated in Fig. 4 the clutch will be released from the pulley $d'$, and its opposite face will be brought into contact with the friction-disk $d^{10}$, Fig. 2, and thereby stop the machine.

Figure 1:
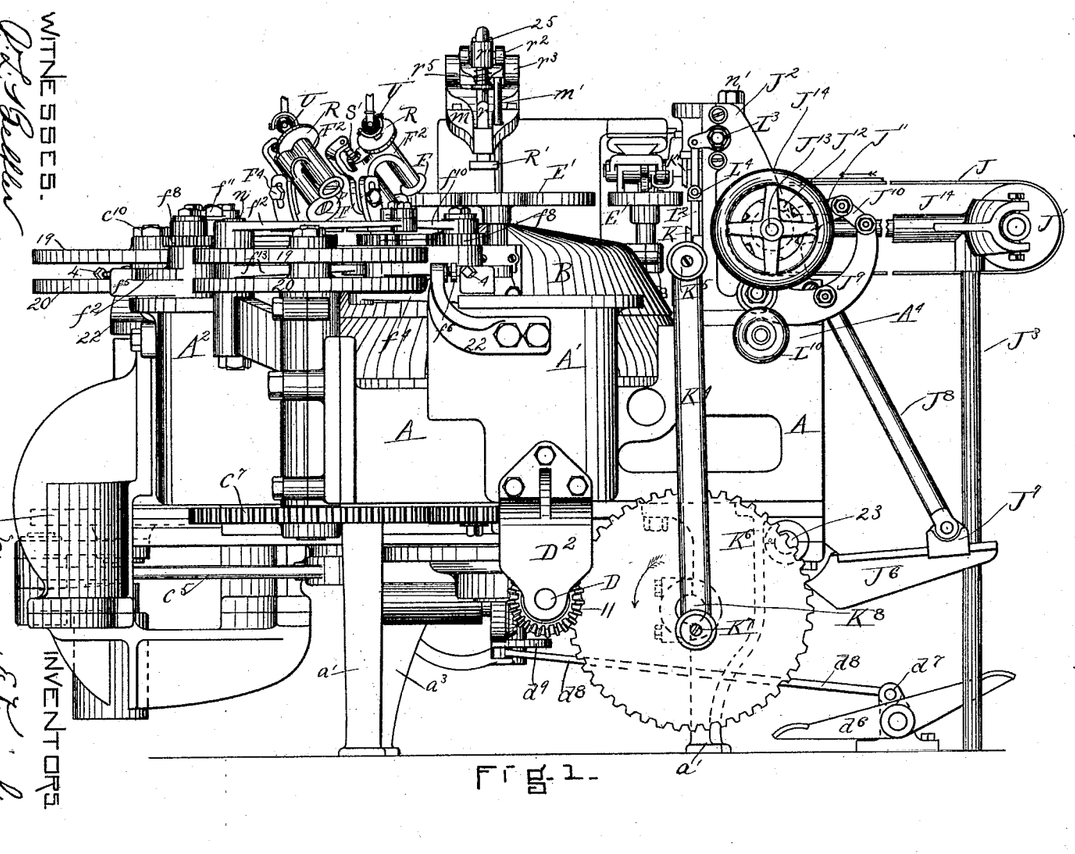
Figure 1 is a front elevation of the machine.
Figure 4:
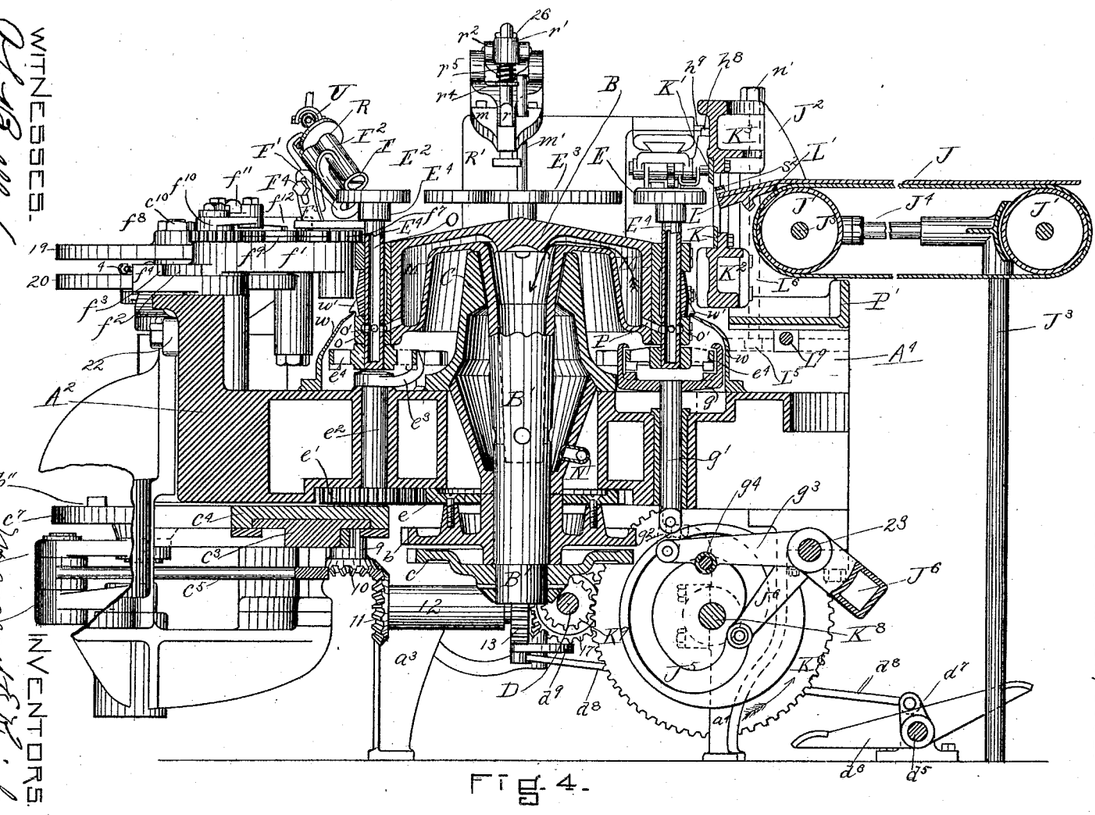
Fig. 4, a vertical section on line $x$ $x$, Fig. 3.
Figure 5:
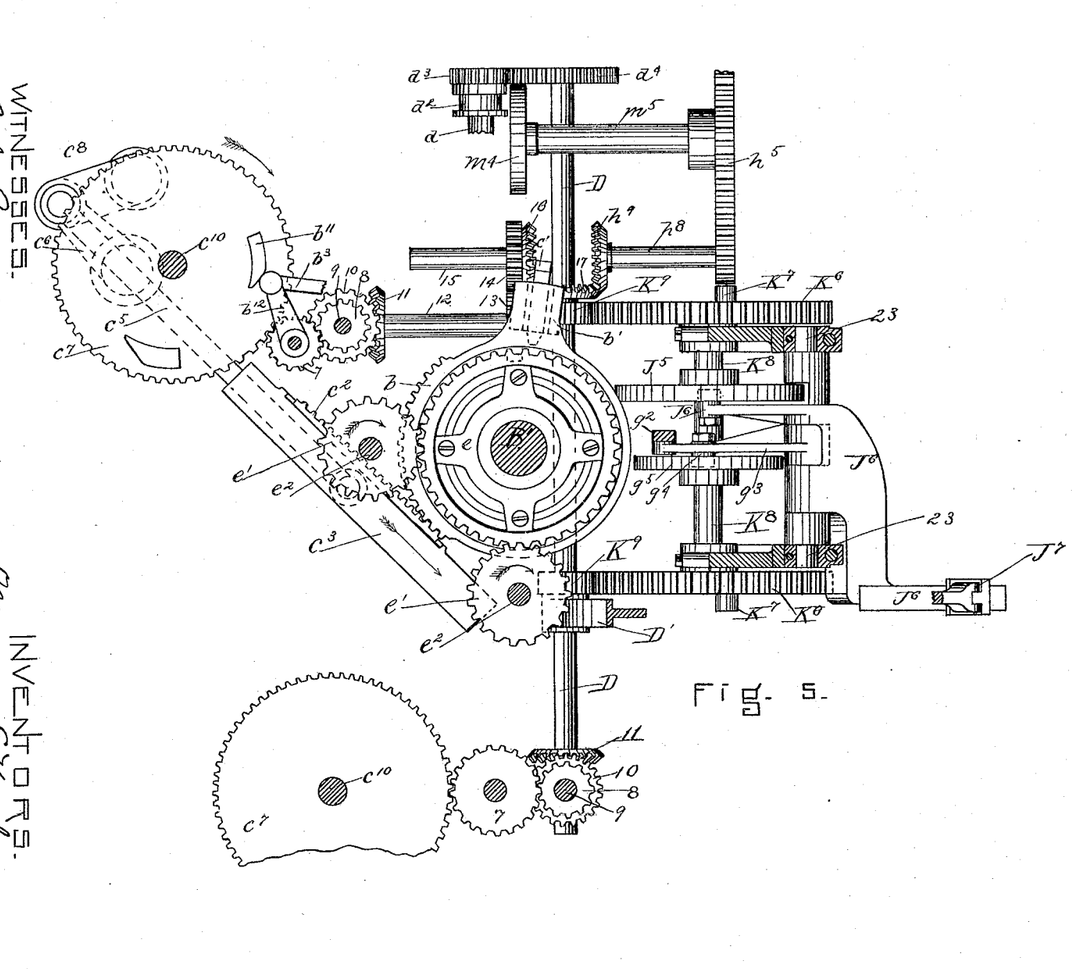
Fig. 5 is a diagrammatic plan of the gearing.
Figures 6, 7:
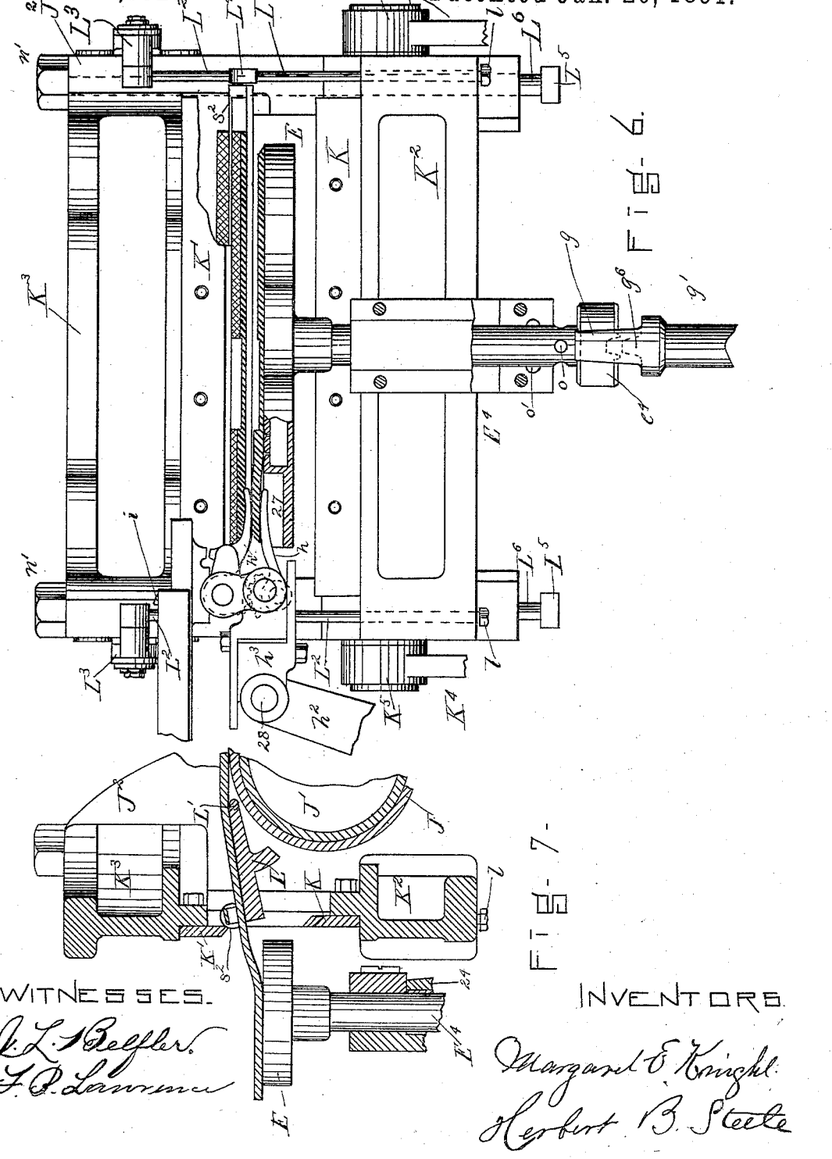
Fig. 6, an enlarged view of the pattern loading and stripping devices looking from the center of the machine, Fig. 3, the stripping devices being about to remove the completely-cut article from the pattern in its lowered position.
Fig. 7, an enlarged section of the blank-cutting and pattern-loading devices with the end of the material just pushed upon the pattern, which is in a position lower than shown in the rest of the figures other than Fig. 6.
Figure 10:
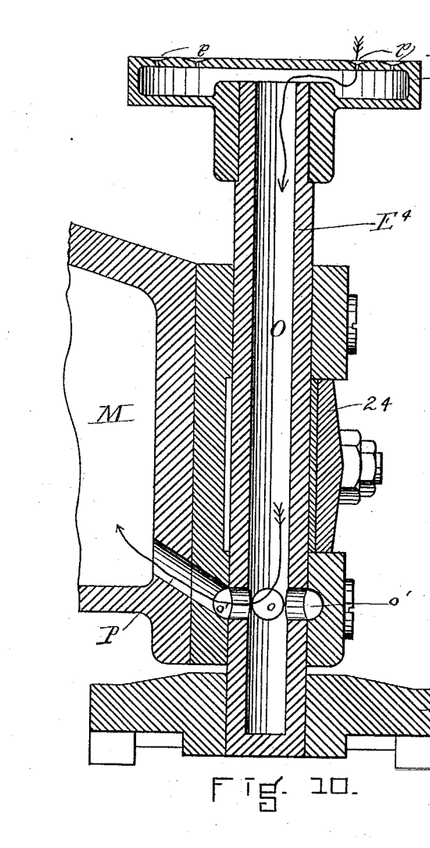
Fig. 10, an enlarged vertical section through the pattern, its spindle and carrier or turret of the machine.
Figure 11:
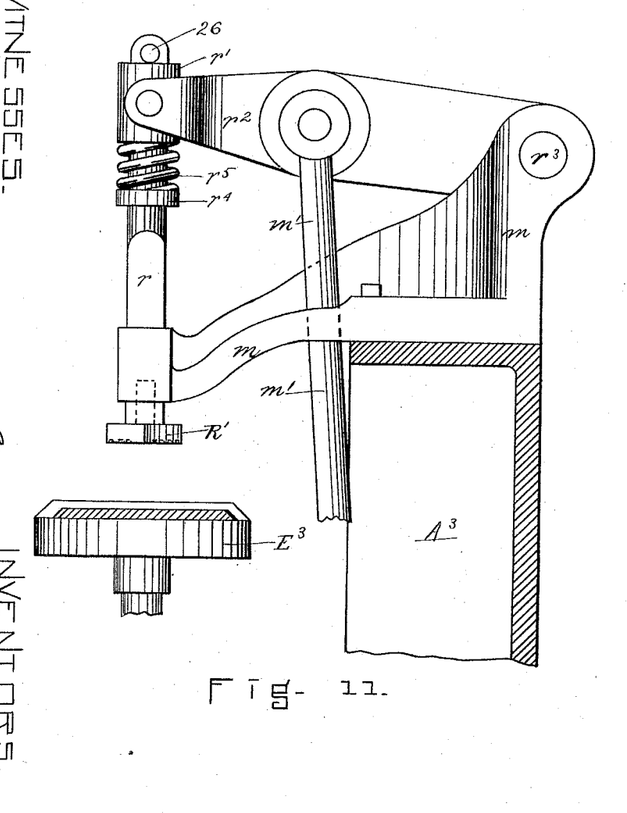
Fig. 11, an enlarged view of the embossing mechanism.

The material is fed to the machine by an endless belt or apron J, which runs over two rollers J', mounted in bearings supported by uprights J² and standards J³, Figs. 1, 3, and 4. This apron J is kept taut by two screw-rods J⁴, which force the bearings of the two rolls apart. The apron is given an intermittent forward movement toward the machine, as indicated by the arrow, Fig. 1, by a cam-groove in the face of the wheel J⁵, in which a cam-roll upon the lower end of the lever J⁶ runs, Figs. 4 and 5. By means of a saddle J⁷ and connecting-rod J⁸, Figs. 1 and 5, the lever J⁶ is connected with the curved lever J⁹, and this, through the link J¹⁰, ratchet-lever J¹¹, and ratchet J¹², turns the shaft J¹³ of the inner roll J' at each throw of the lever J⁶, caused by the cam-roller upon the end thereof following the groove in the cam-wheel J⁵. The length of stroke of the lever J⁹, and hence the size of the blank to be cut, can be regulated by varying the position of the saddle J⁷ upon the end of the lever J⁶. This lever has its fulcrum upon the shaft 23. A hand-wheel J¹⁴ upon the shaft J¹³ enables the operator to turn the inner roll J', and thus move the apron J and arrange the strip of material in proper position with relation to the blank-cutting knife before the machine is started. After the machine is adjusted and the material placed upon the apron J, it will be fed between the knives and onto the pattern E the same distance at each revolution of the cam J⁵. Immediately before the material is fed forward by the apron J the pattern is drawn down from the position shown in Figs. 4 and 10 to that shown in Figs. 6 and 7. As the pattern is descending, a pair of stripping-fingers, hereinafter described, take hold of the article thereon, Fig. 6, which has been completely trimmed, and draw it off and deposit it upon a moving belt, which carries it from the machine. As soon as the trimmed article has been removed from the pattern the apron J pushes the end of the material forward between the blank-cutting knives and onto the pattern, as illustrated in Fig. 7. The mechanical devices by which the pattern is drawn down are shown in Figs. 4 and 6, where the hooked ends of the yoke $g$ upon the upper end of the vertical rod $g'$ project over the ends of the S-shaped pieces $e^4$ on the lower end of the pattern-spindles, and by means of the link $g^2$, lever $g^3$, cam-roll $g^4$, and cam $g^5$, connecting the rod $g'$, and a groove in the cam $g^5$, the rod $g'$ and with it the pattern E and its spindle are lowered to the position shown in Figs. 6 and 7 at the proper time with each rotation of the cam $g^5$. The lever $g^3$ has its fulcrum upon the shaft 23, and by the upward movement of that lever the rod $g'$ and the pattern E, with its spindle, are raised; and in order that the pattern may be placed in a position suitable for the rotary cutters to properly trim the blank when it is transferred to the location E' by the revolution of the turret, we provide a pair of wedge-shaped projections $g^6$ upon the upper side of the horizontal portion of the yoke $g$, which will enter depressions formed in the lower side of the S-pieces $e^4$, of a shape the counterpart of the wedges shown in dotted lines, Fig. 6, and thus always insure the adjustment of the pattern to the same position. We also provide a friction-piece 24 to bear upon the side of the spindle $E^4$ to prevent the pattern from being easily moved from its required position. After the pattern has been lowered and the material from which the blank is to be cut has been fed forward upon it and between the blank-cutting knives K K', as shown in Fig. 7, the cross-head $K^2$, which carries the knife K, is raised by two connecting-rods $K^4$, pivoted thereto at $K^5$, and to gears $K^6$ by crank-pins $K^7$. The gears $K^6$ are secured upon a shaft $K^3$, and are driven by pinions $K^9$ upon the shaft D, and with each revolution of the gears $K^6$ the knife K in the cross-head $K^2$ is raised sufficiently to act in conjunction with the knife K' to cut off a blank. The knife K' is screwed to the fixed cross-head $K^3$, which is supported by the uprights $J^2$. As the cross-head $K^2$, with the knife K, is raised by the rotation of the gears $K^6$, the pattern E is also raised through its connection with the cam-wheel $g^5$, which is upon the same shaft $K^3$, and turns with the gears $K^6$. A swinging shelf L, located between the uprights $J^2$, is pivoted therein at either end at L' and with that edge of the shelf as near as practicable to the apron J and in substantially the same plane as the upper surface of the apron, so that as the material is fed forward by the apron it will rest upon the shelf L and be properly carried over the space intervening between the roller J' and the pattern E. By means of two eye-rods $L^2$, hung upon two friction-arms $L^3$, screwed one upon the outer side of each upright $J^2$, the free edge of the shelf or that toward the pattern E is supported by a pin $L^4$ at each end, which rests in the eye in one of the rods $L^2$ at that point, Figs. 1 and 6. The rods $L^2$ are extended downward through holes in the ends of the cross-head $K^2$ and have a nut or enlargement $l$ upon their respective ends below the cross-head. When the cross-head $K^2$ rises, it strikes the enlargements in the rods at $L^4$, and thus carries the rods upward, and with them the free edge of the shelf L until its under surface is above the upper surface of the pattern when at its highest position. The shelf is held in this elevated position by the friction-arms $L^3$ until the cross-head $K^2$ descends and strikes the enlargements $l$ upon the ends of the rods, and thus pulls them down, together with the shelf. To prevent the end of the material from sticking upon the back side of the knife K' after a blank has been cut off, we attach a scraping-bar $s^2$ to the upper side of the shelf and extend it across the length of the free edge thereof, but raised sufficiently above the surface of the shelf to allow the material to freely pass beneath. Thus when the shelf descends the end of the material will be carried with it to a position from which it will be pushed forward upon the pattern at the next movement of the apron J.

The machine is adjusted so as to deposit blanks of various sizes centrally of their width upon patterns of corresponding size by moving the uprights $J^2$ and their connecting parts toward or from the pattern, as its size may require. This is accomplished by supporting those uprights upon the extended portions $A^4$ of the frame of the machine and securing them together by forming inverted-T grooves $L^5$ in the upper face of the portions $A^4$ and running rods $L^6$ down through the uprights $J^2$ and forming enlarged ends thereon of the same shape as the grooves $L^5$ in cross-section. By means of nuts $n'$ upon the top of these rods the frame, consisting of the uprights $J^2$, cross-head $K^3$, and a base-piece P', which supports the knives K K', the rolls J' and their connecting mechanism may be held firmly upon the pieces $A^4$. When the nuts $n'$ are loosened, the said frame may be moved in or out upon the portions $A^4$ by means of racks $L^7$ upon the lower edge of the frame, which mesh with pinions $L^8$ upon the shaft $L^9$, having a hand-wheel $L^{10}$, by which it may be turned, Fig. 2.

Figure 13:
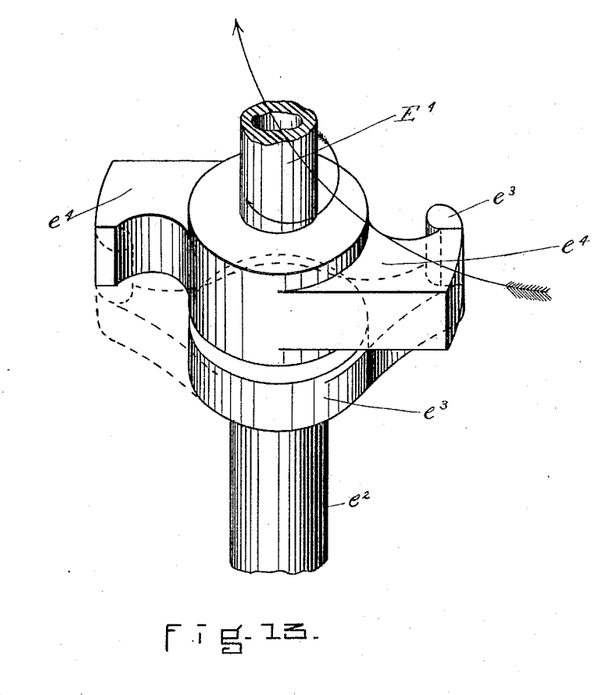
Fig 13, an enlarged perspective view of the devices by which the patterns are turned a half-revolution for the trimming operation.

As heretofore stated, the patterns E E' $E^2$ $E^3$ and their hollow spindles $E^4$ are supported in and carried by the turret B. Each spindle $E^4$ has upon its lower end a double hook or S-shaped arm $e^4$, which, when at the two positions of E' $E^2$, are engaged by and turned a half-revolution by a crank-shaped dog $e^3$ upon the upper ends of two perpendicular shafts $e^2$, located below the pattern-spindles $E^4$, Figs. 4 and 13. Each of the shafts $e^2$ has upon its lower end a small gear $e'$, which engages with the large gear $e$, which is screwed to the quadrant-gear $b$ and with it turns upon the spindle $B^7$. Each movement of the rack-bar $c^3$ in the direction indicated by the arrow thereon, Fig. 5, causes the quadrant-gear $b$, and with it the gear $e$, to rotate a quarter-turn in the direction indicated by the arrow thereon. This movement of the gear $e$ causes the two small gears $e'$ to turn a half-revolution in the opposite direction, as indicated, they being only one-half of the diameter of the gear $e$, and, as above explained, the revolution of the gears $e'$ through their shafts $e^2$ and cranks $e^3$, acting upon the S-arms $e^4$ on the lower ends of the pattern-spindles $E^4$, turn the patterns upon their respective upper ends a half-revolution, when they occupy the position indicated at $E'$ $E^2$, Fig. 3, and at the same time duplicate sets of cutting mechanism located at those respective positions each trim one-half of a blank held upon the pattern to the shape of one side thereof. Each movement of the rack-bar $c^3$ in the direction opposite to that indicated by the arrow, Fig. 5, causes the quadrant-gear $b$, gear $e$, and gears $e'$ to rotate in a direction also opposite to that indicated by the arrows. At the beginning of this return movement of the rack-bar $c^3$ the cranks $e^3$ are in the position shown by dotted lines, Fig. 13, and, as above explained, the latch $c'$ has during the operation of trimming the blank to the shape of the pattern been withdrawn from the socket (shown in full lines, Fig. 12) and transferred to the one indicated thereon in dotted lines; also, the latch $b^2$, just at the completion of the trimming operation, is withdrawn from the socket in the turret B, and as the rack $c^2$ continues its backward movement the gear $e$, quadrant-gear $b$, and disk $c$, to which it is locked by the latch $c'$, together with the turret B, all make a quarter-rotation in the direction indicated by the arrow, Fig. 12, to the position there shown, and the patterns, with their spindles and arms $e^4$, revolve with the turret in the direction indicated by the arrow thereon, Fig. 3. The reverse movement of the gears $e'$ also turn the cranks $e^3$ from the position shown in dotted lines to that in full lines, Fig. 13, the movement of the upturned end of the crank being timed to meet the end of the arms $e^4$ on the bottom of the pattern-spindles just as each quarter-turn of the turret is finished, where it is ready to rotate the pattern upon the next forward movement of the rack-bar $c^3$.

In the machine as herein organized there are four hollow patterns E $E'$ $E^2$ $E^3$, each having perforations $p\ p$ through its upper surface and each being supported upon a hollow spindle, the opening O in which communicates with the chamber within the pattern. (See Fig. 10.) Near the lower end of the opening O we make two or more holes $o$ through the spindles $E^4$ coincident with an annular groove $o'$ in the spindle-bearing. From this annular groove a passage P is cut into a chamber M within the turret B. The spindle $B'$ is also hollow and is in communication with the chamber in the turret. There are openings from the hollow spindle $B'$ into the sleeve C and by connecting an air-pump with this sleeve through a pipe N a strong current of air can be drawn down through the perforations $p$ in each pattern into their hollow spindles and out through the chambered turret and its hollow spindle. When the perforations $p$ are closed by placing a blank upon the pattern, it is held there firmly by the tendency to a vacuum beneath it produced by the air-pump. When it is desired to remove the article from the pattern after it has been trimmed, the pattern, with its spindle, is drawn down, as in Fig. 6, by mechanism hereinbefore described, which carries the small holes $o$ near the lower end of the spindle, below the annular groove $o'$, and thus admits air through the hollow spindle to the chamber beneath the article when it may be readily removed from the pattern.

In order to increase the capacity of production of the machine, we employ two sets of trimming mechanisms. In this description we will refer to the trimming-cutters and their operating mechanism, which are supported upon the projecting part $A^2$ of the frame which is at the location of the pattern $E^2$; the cutters and operating mechanism at the location $A'$ being in all respects duplicates of those at $A^2$.

Figure 9:
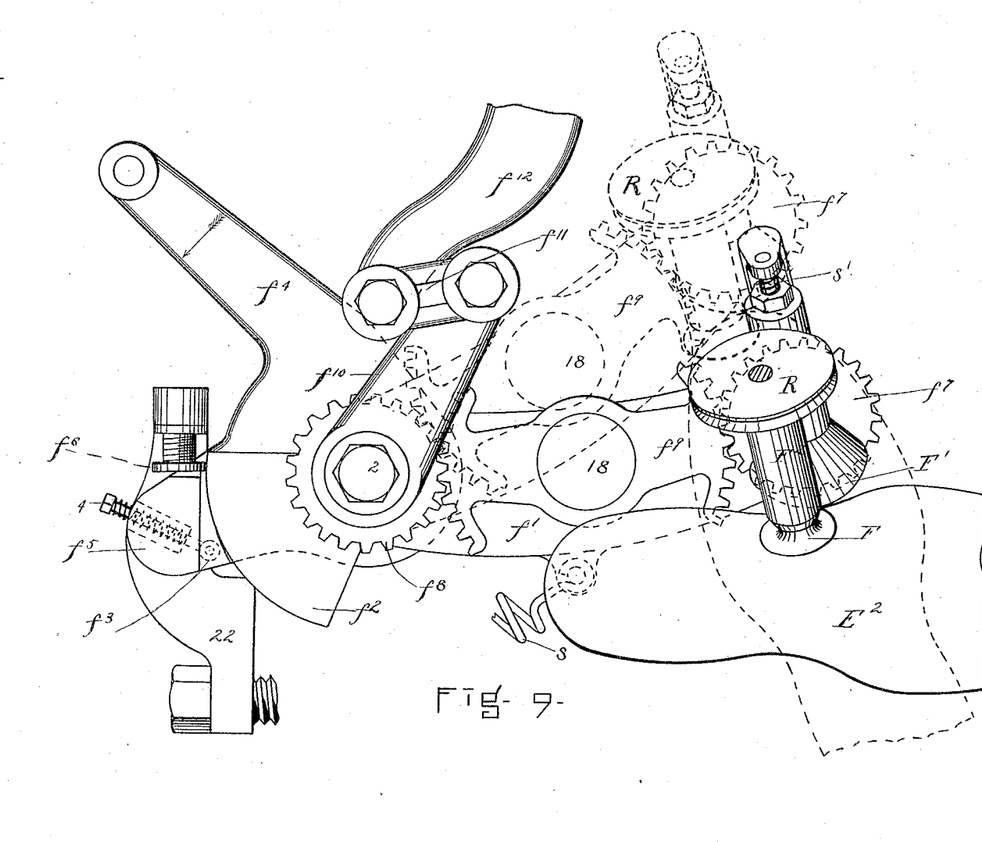
Fig. 9, a plan of the same parts in full lines and dotted lines to show two different positions.

As seen in the enlarged view, Fig. 8, F $F'$ are respectively the upper and lower rotary cutters journaled in a frame $F^2$, which is adjustably supported upon a slotted standard $F^3$ by a binding-screw $F^4$. The standard $F^3$ is supported upon a pivot $f$ in the arm $f'$, having a journal 2 in the portion $A^2$ of the frame. The distance between the cutters and the edge of the pattern is controlled by means of a slide $F^5$, having a friction-bearing roll $F^6$ upon its inner end and an adjusting-screw 3. The swiveling arm $f'$ is spread into a fan shape $f^2$ at the end opposite to the cutters and with its periphery formed in the arc of a circle, Fig. 9, by means of a wedge $f^3$, which is held against an offset $f^5$ of the lever $f^4$ by a rod and spring 4. The fan $f^2$ is clutched whenever the lever $f^4$ is moved in the direction of the arrow thereon, and thus swings the inner end of the arm $f'$, and with it the cutters F $F'$, away from the turret. This is effected automatically by means of a cam-roll upon the end of the lever $f^4$, which runs in a cam-groove on the under side of the disk 20, Figs. 1, 3, and 4, upon each occasion while the turret is making a quarter-rotation. When the lever $f^4$ moves back again, they are released from one another as soon as the wedge $f^3$ is pushed outward by reason of its small end coming in contact with an abutting-screw $f^6$, supported in a bracket 22, and immediately a spring $s$ again acts to hold the bearing-roll $F^6$ in contact with the pattern.

Figure 2:
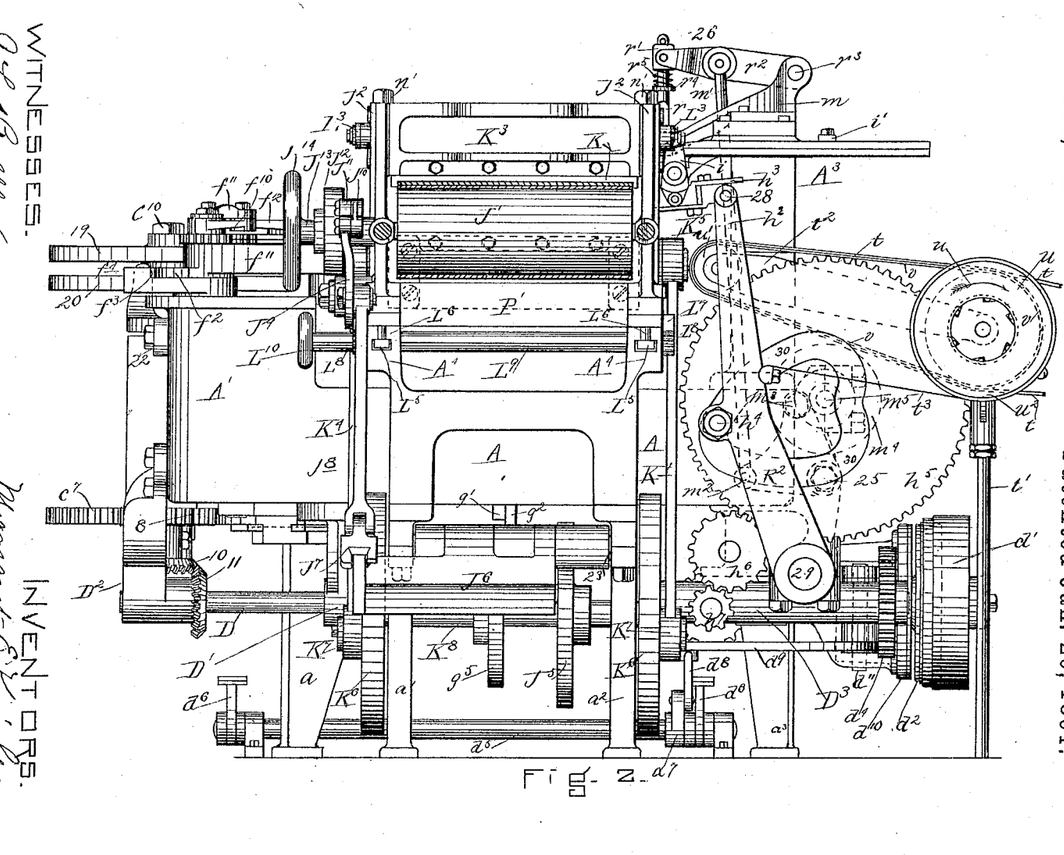
Fig. 2, an elevation at the feed end.

In order to maintain the cutters at the best cutting angle and give them a proper clearance with relation to the edge of the article which is being cut, we attach to the pivot $f$ above the arm $f'$ the gear $f^7$, and upon the upper end of the journal 2 we pivot the gear $f^8$, and between these two gears, upon the arm $f$, we pivot at 18 an arm $f^9$, provided with a segment-gear upon either end, which meshes into the respective gears $f^7$ $f^8$, and by means of a suitably-shaped cam-groove upon the under side of the cam-wheel 19 the cutters and frame are turned on the spindle $f$ through their interconnection by the gear $f^7$, arm $f^9$, gear $f^8$, lever $f^{10}$, which is fast thereto, link $f^{11}$, a double lever pivoted on the pin $n$ and having one part $f^{12}$ above the cam-wheel 19 and another part $f^{13}$ below the wheel 19, with the cam-roll 21, which works in a cam-groove therein, Figs. 9, 8, 4, and 3. The two cam-wheels 19 and 20 and the gear $c^7$ are all fast upon the same vertical shaft $c^{10}$, and consequently it will be seen that the movements of the cutter-frame through its connections with the cam-wheel 19 at the top of that shaft can be readily timed to the rotation of the pattern through its connection with the gear $c^7$ at the bottom of the shaft. An illustration of the automatic adjustment of the cutters with relation to the curves of the pattern at different portions of its periphery may be seen in Fig. 9. In the position shown in full lines the cutters are operating in the "shank" of a shoe-sole pattern. In the position shown in dotted lines they are operating at the toe. The upper cutter F is positively driven by power communicated through a universal joint-connection with the rear end of its journal at U, Figs. 1, 4, and 8. The lower cutter F' is driven by frictional contact with the upper cutter, and is held in yielding contact therewith by a spring $s'$; also, in order that the upper cutter may be kept sharp readily, we provide a sharpening-wheel $q$, hung in arms $q'$, so that it may be swung down against the cutter or turned up away from it, as indicated in full and dotted lines, Fig. 8, and driven by band-connection with the pulley R upon the journal of the upper cutter. After the second half of the article has been trimmed by the cutters at the position $E^2$, Fig. 3, the quarter-rotation of the turret carries it to the position $E^3$ where it may be embossed or stamped by a die $R'$, bearing any desired design. This embossing-die is held in a socket at the end of a rod $r$, supported in an arm $m$ upon the top of the branch $A^3$ of the main frame, and is operated by pivoting a sleeve $r'$, through which the rod $r$ plays, to the end of a yoke-lever $r^2$, which has its fulcrum at $r^3$ in the arm $m$. Near the middle of the lever $r^2$ a connecting-rod $m'$ is pivoted, Fig. 2, and this extends down, and is pivoted at $m^2$ (see dotted lines) to one arm of a crank-lever $R^2$, having its fulcrum at 25. On the other arm of the crank-lever $R^2$ there is a cam-roll $m^3$, which runs in a groove in a cam-wheel $m^4$ upon the shaft $m^5$, which is rotated by the cam-gear $h^5$, hereinafter described. The rod $r$ extends up through the sleeve $r'$, and is held in the sleeve by a pin 26. Below the sleeve $r'$ there is a collar $r^4$, and between it and the sleeve a spring $r^5$, so that the embossing-die will have a yielding pressure upon the surface of the material as it is impressed thereon. This is chiefly essential when operating upon sheets of unvulcanized india-rubber. This embossing operation occurs at $E^3$, while the two sets of rotary cutters are trimming the article to the shape of the pattern at $E'$ $E^2$, Fig. 3. At the next quarter-turn of the turret the four patterns change position, the trimmed and embossed article arriving at the position E. Immediately the stripping-fingers $h$ $h'$ advance, one above and one below the article, a slot or opening 27 being made in the pattern to admit the finger $h$ below the article, Fig. 6. The fingers are operated by a lever $h^2$, to the upper end of which their supporting-link $h^3$ is pivoted at 28. The lever $h^2$ has its fulcrum at 29, Fig. 2, and is caused to rock thereon by a cam-roll $h^4$, pivoted to the lever at about midway of its length. This cam-roll runs in a cam-groove 30 in the face of the gear $h^5$ upon the shaft $m^5$. The gear $h^5$ is rotated through its connection with the main shaft D by the gears $h^6$ $h^7$, shaft $h^8$, and bevel-gears $h^9$ and 17, Figs. 2 and 5. As the lever $h^2$ is drawn back from the pattern by the rotation of the cam-gear $h^5$, the fingers $h$ $h'$ grasp the finished article and pull it from the pattern. This occurs as the pattern descends to the position shown in Figs. 6 and 7, and as the lever $h^2$ continues its backward movement an upwardly-projecting latch $i$, which is fast upon the pivot of the lower finger $h$, strikes a dog $i'$, fixed upon an extended part of the frame $A^3$, Fig. 2, and turns the finger $h$ downward, thus releasing the article, which drops upon an apron $t$ below, and is thereby carried from the machine. The pivots of the two fingers $h$ $h'$ each have a segment-gear fastened upon one end, Fig. 6, which mesh into one another, thereby increasing the downward movement of the lower finger $h$ as it is turned downward by the action of the dog $i'$ upon the latch $i$. The apron $t$, Fig. 2, is supported near the machine by two pulleys, $u$ upon the standard $t'$, and $u'$ at the end of the arm or bracket $t^2$. Beyond the pulley $u$, at such distance as may be convenient, the apron passes around another pulley. In the machine as organized this apron $t$ is given an intermittent movement by means of a belt $v$ running over the two pulleys $u$ $u'$, the former being turned in the direction of the arrow, Fig. 2, by a clutch or ratchet disk $u^2$ at each movement of the lever $h^2$ toward the machine through its connection therewith by the tape $t^3$, attached to the periphery of the disk $u^2$. When the lever $h^2$ moves back or away from the machine, the disk $u^2$ is turned in the opposite direction by a helical or other suitable spring attached to it. (Not illustrated in the drawings.)

$w$ is an annular shield around the carrier B, with its upper edge beneath a projecting annular rib $w'$ upon the carrier. This is for the purpose of keeping scraps cut off in the trimming operation from falling upon the operating parts of the machine, as also water, which is largely used when operating upon sheets of india-rubber.

We claim—

1. In a machine for cutting articles of curvilinear outline from sheet material, the combination of an intermittently-revolving carrier which supports and carries two or more stock-holding patterns, intermittently-moving mechanism to engage the spindles of each of said patterns at prescribed locations and turn them during the intervals when the carrier is at rest, and a pair of co-operating cutters to trim the article to the shape of the pattern while it is being turned, substantially as described.

2. In a machine for cutting articles of curvilinear outline by pattern, the combination of two or more rotating patterns to hold the stock to be cut, supported in a revolving carrier which is intermittently rotated by a rack and gear, and mechanism by which it is locked to and unlocked from the gear at regular intervals, one or more pairs of rotating cutters, and mechanism, substantially as described, which gives them universal lateral adjustment with relation to the edge of the pattern.

3. In a machine for cutting articles of curvilinear outline to specified form, the combination of an intermittently-revolving carrier which supports and carries two or more stock-holding patterns, an independent clutch or dog beneath the carrier to turn one or more of the patterns during the intervals when the carrier is at rest, and a pair of rotary cutters to trim the article to the shape of the pattern while it is being turned, substantially as described.

4. In an organized machine for automatically cutting articles of specified form from sheet material, the combination of a chambered stock-support which has its upper surface provided with a series of perforations, and which is connected with the suction-pipe of an air-pump, whereby the material may be held upon the support while being cut, a trimming-knife to cut the material to the form of the support, and mechanism, substantially as described, to automatically open or close the air-pipe for the purpose specified.

5. In a machine for cutting sheet material to specified form, the combination of one or more chambered patterns with perforated upper surface, each supported upon a hollow spindle through which the said pattern-chamber is connected with an air-pump, whereby the air may be exhausted from the chamber and the material be held upon the pattern thereby while being trimmed, and mechanism, substantially as described, to close the passage leading to the air-pump and open the passage to the pattern-chamber when the article is to be removed.

6. In a machine for cutting sheet material to specified form, the combination of one or more chambered patterns, each provided with a perforated upper surface and each supported upon a hollow spindle through which the pattern-chamber is connected with an air-pump, whereby the air may be exhausted from the chamber and the material thereby held upon the pattern while being trimmed, and mechanism, substantially as set forth, to lower the pattern and its spindle, and thereby close the passage leading to the air-pump and open the passage to the pattern-chamber when the trimmed article is to be removed and to raise the pattern when another blank has been placed thereon, substantially as described.

7. In a machine for cutting sheet material to specified form, the combination of two or more swiveled stock-holding patterns, an intermittently-revolving turret or carrier which sustains and carries the patterns, blank feeding and cutting devices, essentially such as shown, to cut and feed blanks to one pattern, and cutters to trim the blank upon another pattern in the intervals between the partial rotations of the carrier, substantially as described.

8. In a machine for cutting articles of curvilinear outline from sheet material, organized with blank cutting and feeding mechanism and blank-trimming knives, the combination of two or more pivoted stock-holding patterns supported in a pivoted carrier, a reciprocating rotary disk provided with actuating mechanism, and devices to lock together the said disk and carrier during each oscillation of the disk in one direction, substantially as described.

9. In a machine for cutting articles of specified form by pattern and from blanks cut from sheet material, an intermittently-moving stock-feeding apron, a tilting shelf between the pattern and the apron-support nearest the machine, a reciprocating blank-cutting knife, and friction-supports for the free end of the shelf, which are engaged and raised by the knife-carrying devices when the knife advances in the operation of cutting a blank, and are lowered when the knife retreats, substantially as described.

10. In a machine for cutting sheet material by pattern, the combination of a rotating pattern to hold the stock, a swinging arm which supports and carries the cutter-frame, a pair of trimming-knives supported in the frame which is pivoted at the free end of the said arm, and a cam with interconnecting mechanism, substantially as described, between it and the said frame to automatically turn the frame upon its pivot and keep the plane of the knife-blades substantially tangent at their cutting-edges to the varying curves of the pattern during the cutting operation, substantially as described.

11. In a machine for cutting sheet material to specified form, the combination of two or more stock-holding patterns, an intermittently-rotating turret or carrier to support and carry said patterns, a swinging arm which supports and carries the trimming-knives at its free end, and a cam lever or clutch adapted automatically to engage with the said swinging arm and turn its free end away from the turret during the periods of its partial rotation, substantially as described.

MARGARET E. KNIGHT.
HERBERT B. STEELE.

Witnesses:
J. L. BELFLER,
F. B. LAWRENCE.